United States Patent
Safai (10) Patent No.: US 10,621,713 B2
(45) Date of Patent: Apr. 14, 2020

(54) COMPACT AUTOMATED INSPECTION FOR FOREIGN MATERIALS DURING THE MANUFACTURE OF LARGE COMPOSITE

(71) Applicant: The Boeing Company, Chicago, IL (US)

(72) Inventor: Morteza Safai, Newcastle, WA (US)

(73) Assignee: THE BOEING COMPANY, Chicago, IL (US)

(*) Notice: Subject to any disclaimer, the term of this patent is extended or adjusted under 35 U.S.C. 154(b) by 41 days.

(21) Appl. No.: 16/117,938

(22) Filed: Aug. 30, 2018

(65) Prior Publication Data

US 2020/0074614 A1    Mar. 5, 2020

(51) Int. Cl.
    G06T 7/00    (2017.01)
    H04N 5/225   (2006.01)
    H04N 5/247   (2006.01)

(52) U.S. Cl.
    CPC ......... *G06T 7/0004* (2013.01); *H04N 5/2252* (2013.01); *H04N 5/2256* (2013.01); *H04N 5/22521* (2018.08); *H04N 5/247* (2013.01); *G06T 2207/10024* (2013.01); *G06T 2207/10048* (2013.01)

(58) Field of Classification Search
    CPC ......... G06T 7/0004; G06T 2207/10048; G06T 2207/10024; H04N 5/2256; H04N 5/247; H04N 5/22521; H04N 5/2252
    USPC .......................................................... 348/86
    See application file for complete search history.

(56) References Cited

U.S. PATENT DOCUMENTS

| | | | |
|---|---|---|---|
| 7,126,630 B1 * | 10/2006 | Lee ................... | H04N 5/225 348/218.1 |
| 9,839,946 B2 | 12/2017 | Safai et al. | |
| 2016/0221048 A1 * | 8/2016 | Safai ................. | B08B 5/02 |
| 2018/0262725 A1 * | 9/2018 | Fan ................... | H04N 9/097 |

\* cited by examiner

*Primary Examiner* — Allen C Wong
(74) *Attorney, Agent, or Firm* — McDonnell Boehnen Hulbert & Berghoff LLP (57) ABSTRACT

An example system includes a sensor housing defining a plurality of horizontal layers and a controller. The sensor housing includes a plurality of light-emitted diode (LED) light sources, a plurality of cameras, and a plurality of optical devices. Each camera of the plurality of cameras is positioned within a respective horizontal layer of the plurality of horizontal layers and configured to detect a respective range of wavelengths of light. The plurality of optical devices is configured to receive light reflected by the surface through a common input lens and direct the light to one of the cameras of the plurality of cameras depending on a wavelength of the light. The controller is configured to receive signals from the plurality of cameras indicative of the light reflected by the surface and determine whether there is any foreign object debris material on the surface using the signals from the plurality of cameras.

20 Claims, 4 Drawing Sheets

COMPACT AUTOMATED INSPECTION FOR FOREIGN MATERIALS DURING THE MANUFACTURE OF LARGE COMPOSITE

FIELD

The present disclosure relates generally to foreign object debris detection, and more particularly, to systems and methods for foreign object debris detection during a composite layup process.

BACKGROUND

Composite materials are increasingly used as substitutes for conventional materials, such as aluminum and steel alloys, in various structural components due to the generally high strength-to-weight ratio inherent in composite materials. For instance, composite parts are presently used as parts for aircrafts. Composite materials generally include a network of reinforcing fibers that are applied in layers, and a polymeric resin that substantially wets the reinforcing fibers to form an intimate contact between the resin and the reinforcing fibers. High speed composite layup machines can be used to form each layer. These machines can lay composite material at a rate of up to 3000 inches per minute.

Problems can arise, however, when foreign object debris or contamination is on or within the formed composite part prior to curing. For example, small amounts of entrapped or surface-adhering moisture or other types of contamination can result in delamination and porosity of the composite material once the curing is completed. In addition, debris such as small pieces of bagging materials, Teflon tapes, or breathing material used during the composite layup can become entrapped within a composite layer, resulting in delamination, porosity, and/or wrinkles in the composite part. Some foreign object debris materials are transparent or blend well with a surface color of the composite material, making detection of the foreign object debris materials using visible light cameras difficult or impossible.

If foreign object debris materials are not detected and removed prior to curing, inconsistencies resulting from the foreign object debris material can cause an entire part to be rejected. The rejection of such parts can be quite costly, and can also cause scheduling delays and inventory problems.

SUMMARY

In one example, a system for inspecting a surface is described. The system includes a sensor housing defining a plurality of horizontal layers and a controller. The sensor housing includes a plurality of light-emitted diode (LED) light sources, a plurality of cameras, and a plurality of optical devices. The plurality of LED light sources is configured to illuminate the surface. Each camera of the plurality of cameras is positioned within a respective horizontal layer of the plurality of horizontal layers and configured to detect a respective range of wavelengths of light. The plurality of optical devices is configured to receive light reflected by the surface through a common input lens and direct the light to one of the cameras of the plurality of cameras depending on a wavelength of the light. The controller is communicatively coupled to the plurality of cameras. In addition, the controller is configured to receive signals from the plurality of cameras indicative of the light reflected by the surface and determine whether there is any foreign object debris material on the surface using the signals from the plurality of cameras.

In another example, a sensor housing for a system for inspecting a surface is described. The sensor housing defines a plurality of horizontal layers and includes a plurality of LED light sources, a plurality of cameras, and a plurality of optical devices. The plurality of LED light sources is configured to illuminate the surface. Each camera of the plurality of cameras is positioned within a respective horizontal layer of the plurality of horizontal layers and configured to detect a respective range of wavelengths of light. The plurality of optical devices is configured to receive light reflected by the surface through a common input lens and direct the light to one of the cameras of the plurality of cameras depending on a wavelength of the light.

In another example, a method for inspecting a surface is described. The method includes illuminating the surface using a plurality of LED light sources of a sensor housing. The sensor housing defines a plurality of horizontal layers and includes a plurality of cameras. Each camera of the plurality of cameras is positioned within a respective horizontal layer of the plurality of horizontal layers and configured to detect a respective range of wavelengths of light. The method also includes directing, using a plurality of optical devices of the sensor housing, light reflected by the surface and received through a common input lens of the sensor housing to one of the cameras of the plurality of cameras depending on a wavelength of the light. In addition, the method includes receiving, by a controller from the plurality of cameras, signals indicative of the light reflected by the surface. Further, the method includes determining, by the controller, whether there is any foreign object debris material on the surface using the signals indicative of the light reflected by the surface.

The features, functions, and advantages that have been discussed can be achieved independently in various examples or may be combined in yet other examples further details of which can be seen with reference to the following description and figures.

BRIEF DESCRIPTION OF THE FIGURES

The novel features believed characteristic of the illustrative examples are set forth in the appended claims. The illustrative examples, however, as well as a preferred mode of use, further objectives and descriptions thereof, will best be understood by reference to the following detailed description of an illustrative example of the present disclosure when read in conjunction with the accompanying figures, wherein:

DETAILED DESCRIPTION

Disclosed examples will now be described more fully hereinafter with reference to the accompanying figures, in which some, but not all of the disclosed examples are shown. Indeed, several different examples may be provided and should not be construed as limited to the examples set forth herein. Rather, these examples are provided so that this disclosure will be thorough and complete and will fully convey the scope of the disclosure to those skilled in the art.

Described herein are systems and methods for detecting foreign object debris material. The systems and methods can be used to inspect a surface for foreign object debris material during a composite layup process. An example system for inspecting a surface includes a sensor housing defining a plurality of horizontal layers, and includes a controller. The sensor housing includes a plurality of LED light sources, a plurality of cameras, and a plurality of optical devices. The plurality of LED light sources is configured to illuminate the surface, so that the plurality of cameras can image the surface. Further, each camera of the plurality of cameras is configured to detect a respective range of wavelengths of light. Foreign object debris material can be transparent at a first range of wavelengths of light, such as visible light, but visible within a second range of wavelengths of light, such as ultraviolet light. The use of different cameras configured to detect different respective ranges of wavelengths of light can therefore increase the overall spectrum of light over which the system is able to detect foreign object debris material.

Each camera is positioned within a respective horizontal layer of the plurality of horizontal layers of the sensor housing, and configured to receive light that is reflected by the surface through a common input lens of the sensor housing. The plurality of optical devices is configured to direct light reflected by the surface to one of the cameras of the plurality of cameras depending on a wavelength of the light. As an example, the plurality of cameras can include an ultraviolet light camera positioned within a first horizontal layer and a visible light camera positioned within a second horizontal layer. The plurality of optical devices can direct ultraviolet light to the ultraviolet light camera and direct visible light to the visible light camera. For instance, the plurality of optical devices can include a dichroic filter positioned in the first horizontal layer that allows visible light to pass through to the second horizontal layer but reflects ultraviolet light to the ultraviolet light camera.

There are several advantages of this arrangement of multiple different cameras within respective horizontal layers. The ability of each camera of the plurality of cameras to receive light reflected by the surface through a common input lens allows each camera to image a same area on the surface at a same time. Accordingly, signals received from one camera corresponding to the area can be processed in conjunction with signals received from one or more other cameras corresponding to that same area, thereby improving foreign object debris material detection. The ability of each camera to image a same area at the same time can also make it easier to pinpoint a location of foreign object debris material so that the foreign object debris material can be removed. In conventional inspection systems where each camera receives light through a different respective optical assembly and are horizontally and/or vertically offset from another, it can be difficult to correlate signals received from the different cameras so as to determine the location of foreign object debris material. This difficulty is increased when the system is attached to a composite layup machine that is moving at a high rate of speed. The system described herein makes it easier to combine and process together signals received from different cameras, since each camera images a same area at the same time.

Moreover, arranging each camera within a single sensor housing and allowing each camera to receive light through a common input lens reduces the overall weight of the inspection system. When the inspection system is attached to a head of a composite layup machine, the head is sometimes designed to carry a limited amount of weight. The weight may be allocated between layup material (e.g., a spool of fiber), the inspection system, and other components. Decreasing the weight of the inspection system allows the composite layup machine to carry more layup material, thereby reducing downtime and increasing efficiency. Decreasing the weight of the inspection system can also reduce the amount of strain on the head of the composite layup machine, allowing the inspection system to move at higher speeds and/or with higher rates of acceleration.

The controller of the system is coupled to the plurality of cameras, and configured to receive signals from the plurality of cameras indicative of the light reflected by the surface. The controller is also configured to use the signals from the plurality of cameras to determine whether there is any foreign object debris material on the surface. If, for example, the controller determines that there is foreign object debris material on the surface, the controller can cause air to be directed through an air nozzle of the inspection system and towards the foreign object debris material on the surface, such that the foreign object debris material is removed from the surface and does not become entrapped within the composite part.

In some examples, the controller can be configured to synchronize triggering of the respective cameras of the plurality of cameras, such that the signals indicative of the light reflected by the surface are indicative of light reflected by a same area of the surface. In line with the discussion above, this can allow the controller to process signals from one camera corresponding to the area in conjunction with signals received from one or more other cameras corresponding to the area, thereby improving foreign object debris material detection. When the inspection system is attached to a composite layup machine, the controller can be configured to adjust the frame rates at which the respective cameras of the plurality of cameras operate depending on a layup speed of the composite layup machine. With this adjusting, the inspection system can maintain a relatively constant minimum defect detection size (e.g., a tenth of an inch) regardless of the speed of the composite layup machine. For instance, when the layup speed increases, the controller can increase the frame rate of one or more of the cameras of the plurality of cameras.

The systems described herein can also use thermal excitation to enhance the detection of foreign object debris material on a surface of a composite part being manufactured. The plurality of cameras can include an infrared camera, and a thermal excitation source can be placed at a distance forward of the infrared camera so that the foreign object debris material, if any, absorbs the heat and re-emits such heat with sufficient thermal contrast to be detected by the time the infrared camera images the area of the composite part having the foreign object debris material. In effect, the heated foreign object debris material can become an active infrared emitter. This infrared scanning technique allows for detection of foreign object debris material that may be transparent to visible light, based on a difference in heat emitted by the foreign object debris material and the composite part.

Various other features and variations of the described systems, as well as corresponding methods, are described hereinafter with reference to the accompanying figures.

Figure 1:
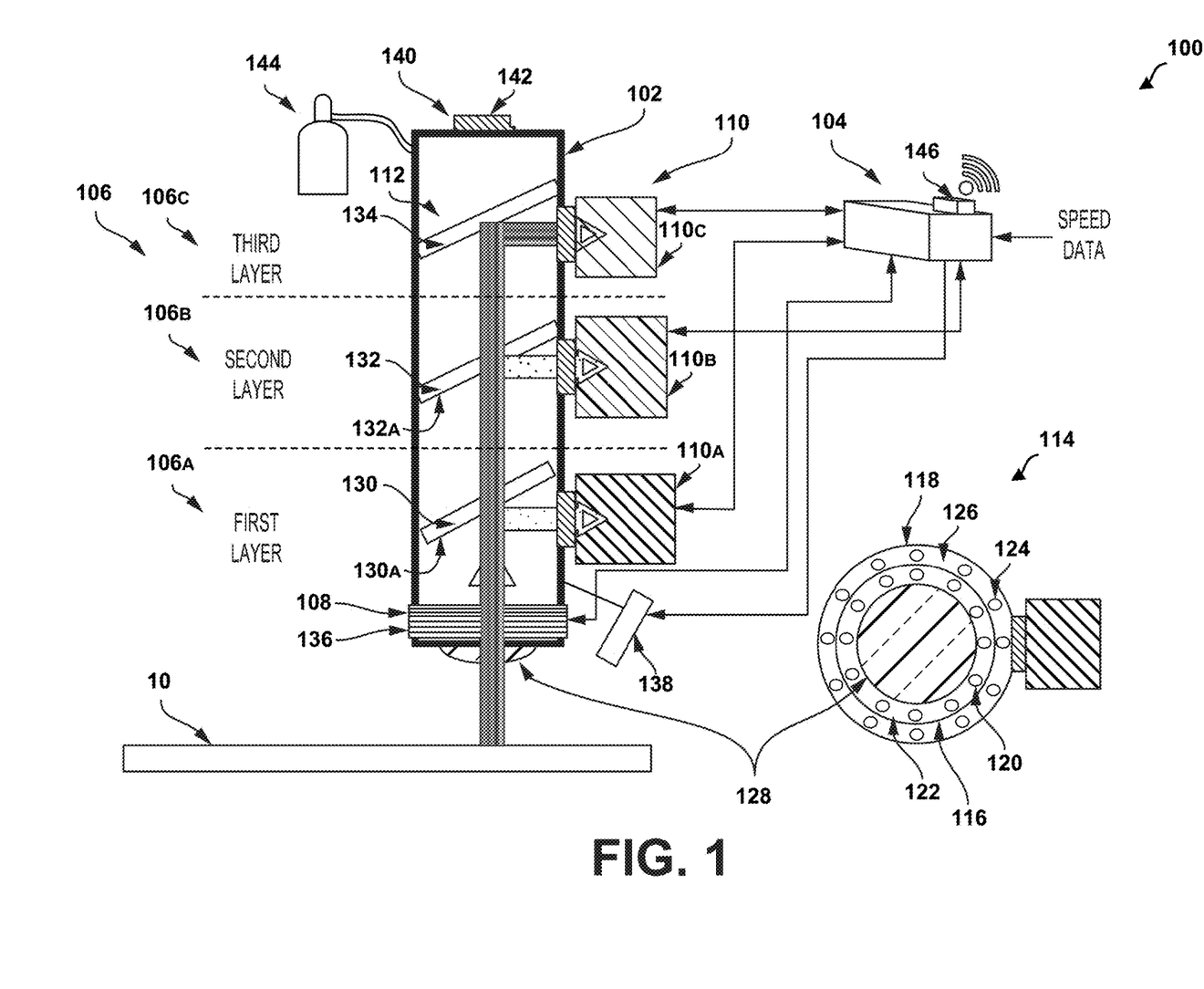
FIG. 1 illustrates a system for inspecting a surface, according to an example.

Referring now to FIG. 1, FIG. 1 illustrates a system 100 for inspecting a surface 10, according to an example. As shown in FIG. 1, system 100 includes a sensor housing 102 and a controller 104. Further, sensor housing 102 defines a plurality of horizontal layers 106 and includes a plurality of LED light sources 108, a plurality of cameras 110, and a plurality of optical devices 112.

Plurality of LED light sources 108 is configured to illuminate surface 10. Surface 10 can be a surface of a composite part. Illuminating surface 10 can cause light to reflect off surface 10, which can then be captured by plurality of cameras 110. Plurality of LED light sources 108 is coupled to controller 104 by way of a wired or wireless link, so that controller 104 can control illumination by plurality of LED light sources 108. Controller 104 can cause plurality of LED light sources 108 to constantly illuminate surface 10 during an inspection. Alternatively, controller 104 can cause plurality of LED light sources 108 to periodically illuminate surface 10. Constantly illuminating surface 10 may reduce complexity of system 100. On the other hand, periodically illuminating surface 10 can reduce an amount of power consumed by system 100. As shown in a cutaway top view 114 of sensor housing 102, plurality of LED light sources 108 can include an ultraviolet light LED light source 116 and a visible light LED light source 118. The use of ultraviolet light LED light source 116 can help to illuminate foreign object debris material that is transparent to visible light.

Ultraviolet light LED light source 116 can include multiple ultraviolet light LEDs 120 arranged in a first ring 122. Similarly, visible light LED light source 118 can include multiple visible light LEDs 124 arranged in a second ring 126. This configuration allows plurality of LED light sources 108 to provide relatively uniform illumination of an area of surface 10. Alternatively, ultraviolet light LEDs 120 and/or visible light LEDs 124 can be arranged in another geometric shape. Sensor housing 102 can also include a binary optical lens for focusing the illumination provided by plurality of LED light sources 108.

Each camera of plurality of cameras 110 is positioned within a respective horizontal layer of plurality of horizontal layers 106, and is configured to detect a respective range of wavelengths of light. For instance, each camera can be configured to detect light having a wavelength that is between a minimum wavelength and a maximum wavelength. specifically, plurality of cameras 110 includes: a first camera 110A positioned in a first horizontal layer 106A and configured to detect light of a first range of wavelengths (e.g., 700 nm to 1 mm); a second camera 110B positioned in a second horizontal layer 106B and configured to detect light of a second range of wavelengths (e.g., 10 nm to 400 nm); and a third camera 110C positioned in a third horizontal layer 106C and configured to detect light of a third range of wavelengths (e.g., 390 nm to 700 nm). First camera 110A, second camera 110B, and third camera 110C can each be connected to controller 104 by way of a wired or wireless link so that controller 104 can control first camera 110A, second camera 110B, and third camera 110C and can receive data from first camera 110A, second camera 110B, and third camera 110C.

First camera 110A can be an infrared camera configured to detect infrared light and configured to output signals indicative of infrared light reflected by the surface. As used herein, the phrase "infrared light reflected by the surface" can include infrared radiation emitted by foreign object debris material on the surface that has absorbed heat and is acting as an infrared emitter. Second camera 110B can be an ultraviolet light camera configured to detect ultraviolet light and configured to output signals indicative of ultraviolet light reflected by the surface. Further, third camera 110C can be a visible light camera configured to detect visible light and configured to output signals indicative of visible light reflected by the surface. Second camera 110B and third camera 110C could each be line scan cameras, capable of operating at a rate of 150,000 lines per second. With this operating rate, foreign object debris materials as small as a tenth of an inch can be detected when the system 100 is moving at a speed of around 3,000 inches per minute. Alternatively, first camera 110A can be an ultraviolet camera, second camera 110B can be a visible light camera, and third camera 110C can be an infrared camera. Further, first camera 110A can be a visible light camera, second camera 110B can be an infrared camera, and third camera 110C can be an infrared camera. Other examples are also possible.

The inclusion of an infrared camera, ultraviolet light camera, and visible light camera can provide system 100 with the ability to detect foreign object debris material over a wide spectrum of light. System 100 can detect foreign object debris material which might not be detected based on reflected visible light but which can be detected based on reflected ultraviolet light and/or reflected infrared light. System 100 can also detect foreign object debris material which might not be detected based on reflected ultraviolet light but which can be detected based on reflected infrared light and/or reflected visible light. Further, system 100 can also detect foreign object debris material which might not be detected based on reflected infrared light but which can be detected based on reflected visible light and/or reflected ultraviolet light.

In line with the discussion above, providing multiple different cameras within sensor housing 102 can reduce the overall weight of system 100, since each camera does not require its own corresponding sensor housing. Providing multiple different cameras within sensor housing 102 can also reduce the complexity of pinpointing a location of any foreign object debris material on surface 10, so that the foreign object debris material can be removed.

Plurality of optical devices 112 is configured to receive light reflected by surface 10 through a common input lens 128 and direct the light to one of the cameras of plurality of cameras 110 depending on a wavelength of the light. Common input lens 128 can be a wideband input lens, so that infrared light, ultraviolet light, and visible light can be received into sensor housing 102. A wideband input lens is a lens through which infrared light, ultraviolet light, and visible light can pass. As shown in FIG. 1, plurality of optical devices 112 includes a first dichroic filter 130 positioned in first horizontal layer 106A, a second dichroic filter 132 positioned in second horizontal layer 106B, and a mirror 134 positioned in third horizontal layer 106C. A dichroic filter is an optical device that selectively passes light within a range of wavelengths while reflecting light that is outside the range of wavelengths.

First dichroic filter 130 can be configured to pass light of a first range of wavelengths to second horizontal layer 106B and to reflect light of a second range of wavelengths that is different from the first range of wavelengths to first camera 110A. To accomplish this, first dichroic filter 130 can be coated with a bandpass filter 130A corresponding to the first range of wavelengths. One of ordinary skill in the art will appreciate that first dichroic filter 130 can be coated with other optical coatings instead of or in addition to the bandpass filter 130A, such that first dichroic filter 130 passes light of the first range of wavelengths and reflects light of the second range of wavelengths. For instance, first dichroic filter 130 could be coated with a shortpass filter that transmits all wavelengths shorter than a specified cut-off wavelength.

Further, second dichroic filter 132 can be configured to pass light of a third range of wavelengths to third horizontal layer 106C and to reflect light of a fourth range of wavelengths that is different from the third range of wavelengths to second camera 110B. To accomplish this, second dichroic filter 132 can be coated with a bandpass filter 132A corresponding to the third range of wavelengths. One of ordinary skill in the art will appreciate that second dichroic filter 132 can be coated with other optical coatings instead of or in addition to the bandpass filter 132A, such that second dichroic filter 132 passes light of the third range of wavelengths and reflects light of the fourth range of wavelengths. For instance, second dichroic filter could be coated with a shortpass filter.

Still further, mirror 134 can be configured to reflect light of the third range of wavelengths to third camera 110C. In this manner, first dichroic filter 130, second dichroic filter 132, and mirror 134 can isolate different portions of light that is received through common input lens 128 based on the wavelength of the portions of light, and direct the portions of light to different cameras of plurality of cameras 110.

As an example, first dichroic filter 130 can be configured to pass ultraviolet light and visible light to second horizontal layer 106B and to reflect infrared light to first camera 110A. Further, second dichroic filter 132 can then be configured to pass the visible light that passes through first dichroic filter 130 to third horizontal layer 106C and to reflect the ultraviolet light that passes through first dichroic filter 130 to second camera 110B. Still further, mirror 134 can be configured to reflect the visible light that passes through second dichroic filter 132 to third camera 110C. In this manner, first dichroic filter 130, second dichroic filter 132, and mirror 134 can direct infrared light to first camera 110A, direct ultraviolet light to second camera 110B, and direct visible light to third camera 110C.

Sensor housing 102 can also include a polarizer 136 configured to stop unwanted radiation from entering into sensor housing 102. Polarizer 136 can, for example, prevent fluorescent light from entering into sensor housing 102, thereby preventing the fluorescent light from being detected by cameras of plurality of cameras 110.

Controller 104 can include a processor and a non-transitory computer-readable medium storing program instructions that are executable by processor to carry out any of the computing device functions described herein. Processor could be any type of processor, such as a microprocessor, digital signal processor, multicore processor, etc. Alternatively, controller 104 could include a group of processors that are configured to execute the program instructions, or multiple groups of processors that are configured to execute respective program instructions. Controller 104 can also include a display, an input device, and one or more communication ports through which controller 104 is configured to communicate with other devices of system 100.

Controller 104 can be configured to receive signals from plurality of cameras 110 indicative of light reflected by surface 10. By way of example, controller 104 can be configured to receive from an ultraviolet light camera signals indicative of ultraviolet light reflected by the surface from an ultraviolet light camera, receive from a visible light camera signals indicative of visible light reflected by the surface, and/or receive from an infrared camera signals indicative of infrared light reflected by the surface.

In addition, controller 104 can be configured to determine whether there is any foreign object debris material on the surface using the signals from the plurality of cameras. Surface 10 can be a surface of a composite part. Surface 10 can therefore have different characteristics than characteristics of any foreign object debris material on the surface, in terms of one or more of reflected visible light, reflected ultraviolet light, or reflected infrared light. Controller 104 can use image processing techniques to detect anomalies in signals received from plurality of cameras 110 and identify the detected anomalies as being indicative of foreign object debris material on surface 10.

For example, controller 104 can calibrate each camera of plurality of cameras 110 on a clean sample of surface 10. The calibration process can establish one or more threshold levels, such as signal intensity thresholds, for plurality of cameras 110. In the case of an infrared signal, the signal intensity could represent a temperature. In the case of a visible light signal or an ultraviolet light signal, the signal intensity could represent a brightness level. When foreign object debris material is on surface 10, controller 104 can determine that signals received from one or more of first camera 110A, second camera 110B, and third camera 110C satisfy one or more threshold levels (e.g., received signal exceeds or falls below a threshold level). In this manner, controller 104 can recognize that foreign object debris material is on surface 10.

As described more fully below, controller 104 can be configured to synchronize triggering of the cameras of plurality of cameras 110 such that the signals indicative of the light reflected by the surface are indicative of light reflected by a same area of the surface. For example, controller 104 can cause each of the cameras of plurality of cameras 110 to start imaging at a time that is defined with respect to a system clock and to then continue imaging light at a periodic rate. This synchronization allows controller 104 to process signals received from multiple cameras together, since the signals each correspond to a same area of surface 10.

Controller 104 can be coupled to an air nozzle 138 by way of a wired or wireless link. In response to determining that surface 10 includes foreign object debris material, controller 104 can cause air to be directed through air nozzle 138 and towards the foreign object debris material on surface 10, so that the foreign object debris material is blown off surface 10.

Controller 104 can also receive speed data from a composite layup machine to which system 100 is attached. The speed data could be optical encoder data indicative of a speed at which a head of the composite layup machine to which system 100 is attached is moving. Controller 104 can use the received speed data to determine when to cause air to be directed through air nozzle 138, so that the air blows the foreign object debris material off surface 10.

Controller 104 can also use the received speed data to adjust the frame rates at which the respective cameras of plurality of cameras 110 operate. As the speed of the head of the composite layup machine increases, controller 104 can increase the frame rates at which the cameras of plurality of cameras 110 operate. Conversely, as the speed decreases, controller 104 can decrease the frame rates at which the cameras of plurality of cameras 110 operates. With this adjusting, the inspection system can maintain a relatively constant minimum defect detection size (e.g., a tenth of an inch) regardless of the speed of the composite layup machine.

System 100 can also include a cooling source 140. Cooling source lowers a temperature of sensor housing 102 when system 100 operates in hot environments and prevent components of sensor housing 102 from overheating. For example, system 100 can be attached to a composite layup machine that has a heat gun for impregnating resin fibers. In such an environment, cooling source 140 can prevent plurality of cameras 110 from overheating. Cooling source 140 can include a solid-state thermoelectric cooler 142. Such coolers have a relatively small size and few moving parts, which is advantageous for reducing the overall weight and complexity of system 100.

Furthermore, system 100 can include a nitrogen purging system 144 configured to purge sensor housing 102 with nitrogen. Purging sensor housing 102 with nitrogen can help keep moisture and other airborne contaminates from affecting plurality of optical devices 112. For instance, purging sensor housing 102 with nitrogen can help prevent moisture and airborne contaminates from interfering with light that interacts with plurality of optical devices 112 within sensor housing 102.

System 100 can also include a radio-frequency communication module 146. Radio-frequency communication module 146 can include an antenna and circuitry for wirelessly transmitting and/or receiving data. Radio-frequency communication module 146 can be coupled to controller 104. System 100 can use radio-frequency communication module 146 to wirelessly transmit data to another device, such as data indicating the presence of foreign object debris material on surface 10. The other device could then provide an audible or visible indication that is indicative of the presence of foreign object debris material on surface 10, so that an operator can take appropriate corrective action.

Figure 2:
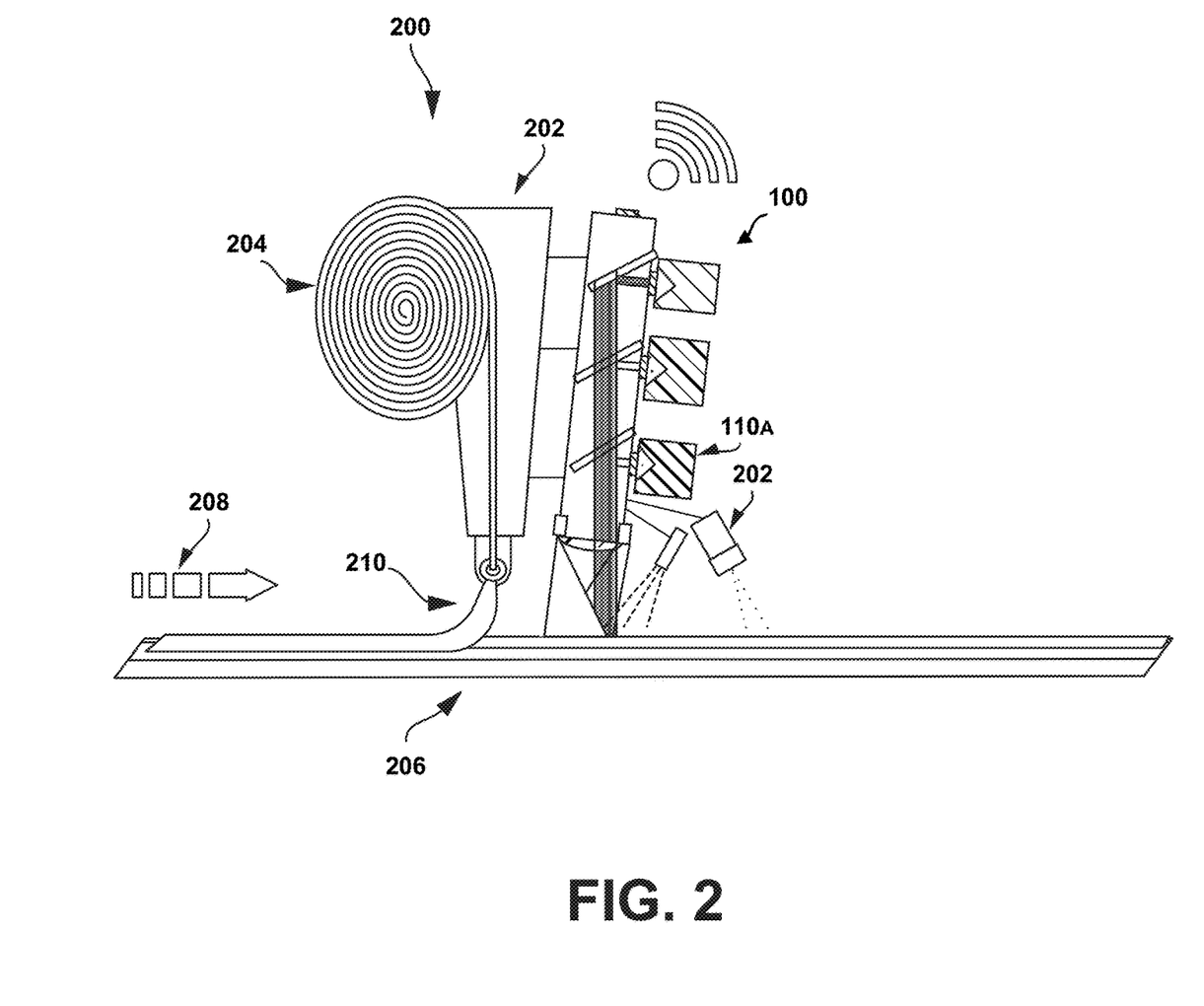
FIG. 2 illustrates the system of FIG. 1 attached to a composite layup machine.

As discussed above, system 100 can be attached to a composite layup machine. FIG. 2 illustrates the system 100 of FIG. 1 attached to a head 202 of a composite layup machine 200. As shown in FIG. 2, head 202 includes a composite roll 204. As head 202 moves across a composite part 206 in a direction shown by arrow 208, head 202 lays a new layer 210 on to composite part 206. Problems can arise when foreign object debris material is present on composite part 206. Attaching system 100 to head 202 of composite layup machine 200 allows system 100 to detect and remove any foreign object debris material on composite part 206 before new layer 210 is deposited over the foreign object debris material.

FIG. 2 also shows a thermal excitation source 212 coupled to system 100. Thermal excitation source 212 can emit thermal energy at a distance forward of composite layup machine 200 so that the foreign object debris material, if any, absorbs the heat and re-emits such heat with sufficient thermal contrast to be detected by the time an infrared camera, such as first camera 110A, images any area of composite part 206 having the foreign object debris material. In effect, the heated foreign object debris material can become an active infrared emitter a few milliseconds after thermal excitation source 212 excites the foreign object debris material. This infrared scanning technique allows for detection of foreign object debris material that may be transparent to visible light, based on a difference in heat emitted by the foreign object debris material and composite part 206.

Figure 3:
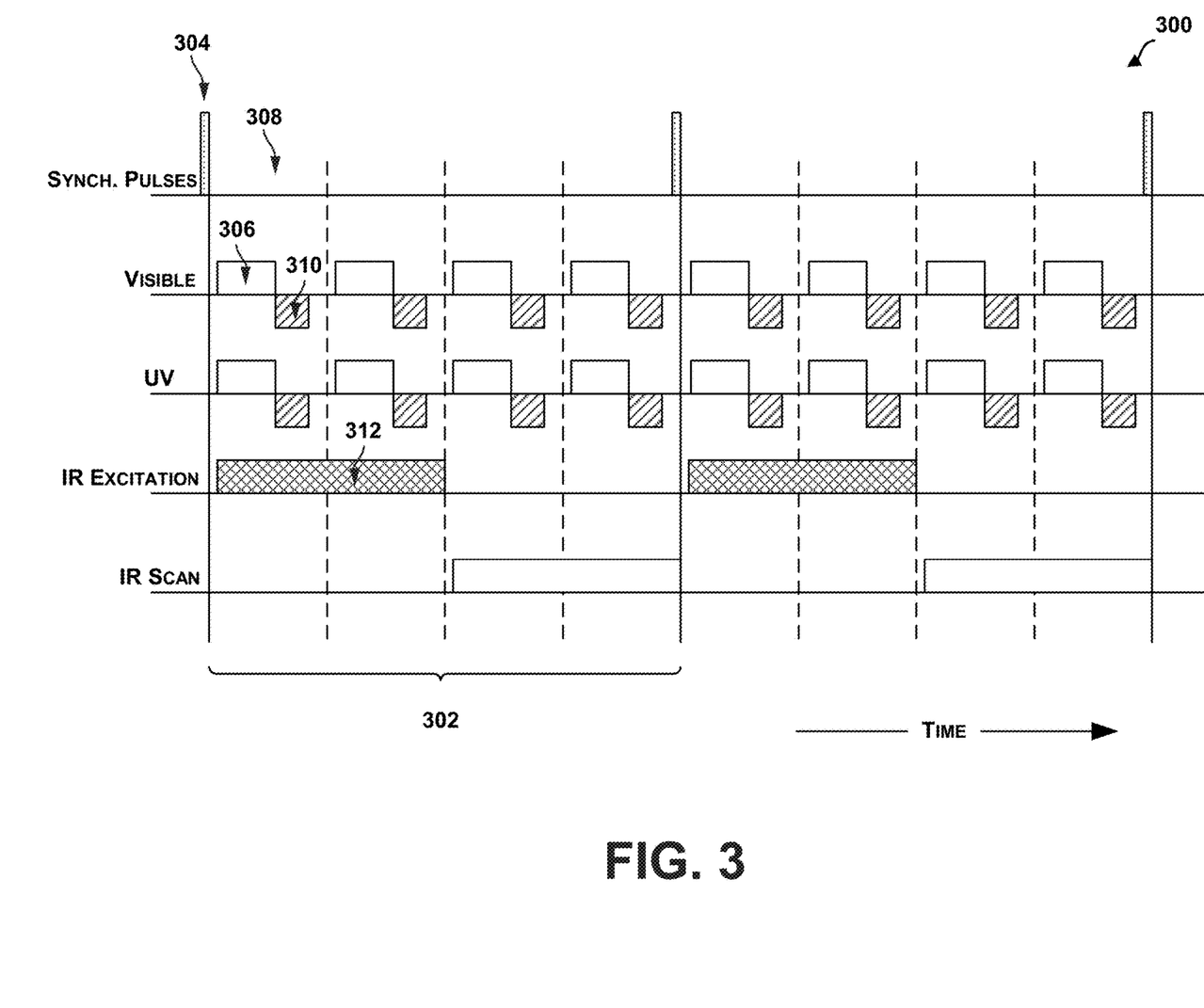
FIG. 3 illustrates a timing diagram, according to an example.

FIG. 3 illustrates a timing diagram 300, according to an example. Timing diagram 300 illustrates how operation of three different cameras, namely, a visible light camera, an ultraviolet light camera, and an infrared camera, can be synchronized so that the three cameras image the same area of a surface during an integration window 302. Integration window 302 is a periodically-repeating period of time.

As shown in FIG. 3, a controller, such as controller 104 of FIG. 1, may establish a primary synchronization pulse 304 that indicates the start of an integration window 302. Further, the controller can configure the visible light camera and the ultraviolet light camera to capture incoming light during capture time periods 306 (represented by the solid blocks) within integration window 302. For instance, the controller could configure the visible light camera and the ultraviolet light camera such that the visible light camera and the ultraviolet light camera capture incoming light once per subframe 308 during each of four subframes within integration window 302. The length of subframe 308 includes time for the visible light camera and the ultraviolet light camera to transfer data, as indicated by the data-transfer time periods 310 (represented by the diagonally-shaded blocks).

In addition, controller could configure a thermal excitation source to excite the surface during a thermal-excitation time period 312 (represented by the crosshatch-shaded blocks). The length of thermal-excitation time period 312 can span the first two subframes of integration window 302. The controller can also configure the infrared camera to capture incoming light (in other words, "scan") during a capture time period spanning the last two subframes within integration window 302. This arrangement is advantageous so that the infrared light emitted by the thermal excitation source does not saturate the infrared camera when the infrared camera is capturing incoming light.

As timing diagram 300 demonstrates, the systems described herein can take advantage of the fact that the visible light camera and the ultraviolet light camera might be able to operate at a faster rate than a rate at which the infrared camera operates. When processing signals received from the three cameras for integration window 302, a controller can average signals received from the visible light camera that correspond to the four capture time periods within integration window 302. Likewise, the controller can average signals received from the ultraviolet light camera that correspond to the four capture time periods within integration window 302. Such averaging can help to reduce noise from the signals received from the ultraviolet light camera and the visible light camera, thereby improving the ability of the system to detect foreign object debris material.

Figure 4:
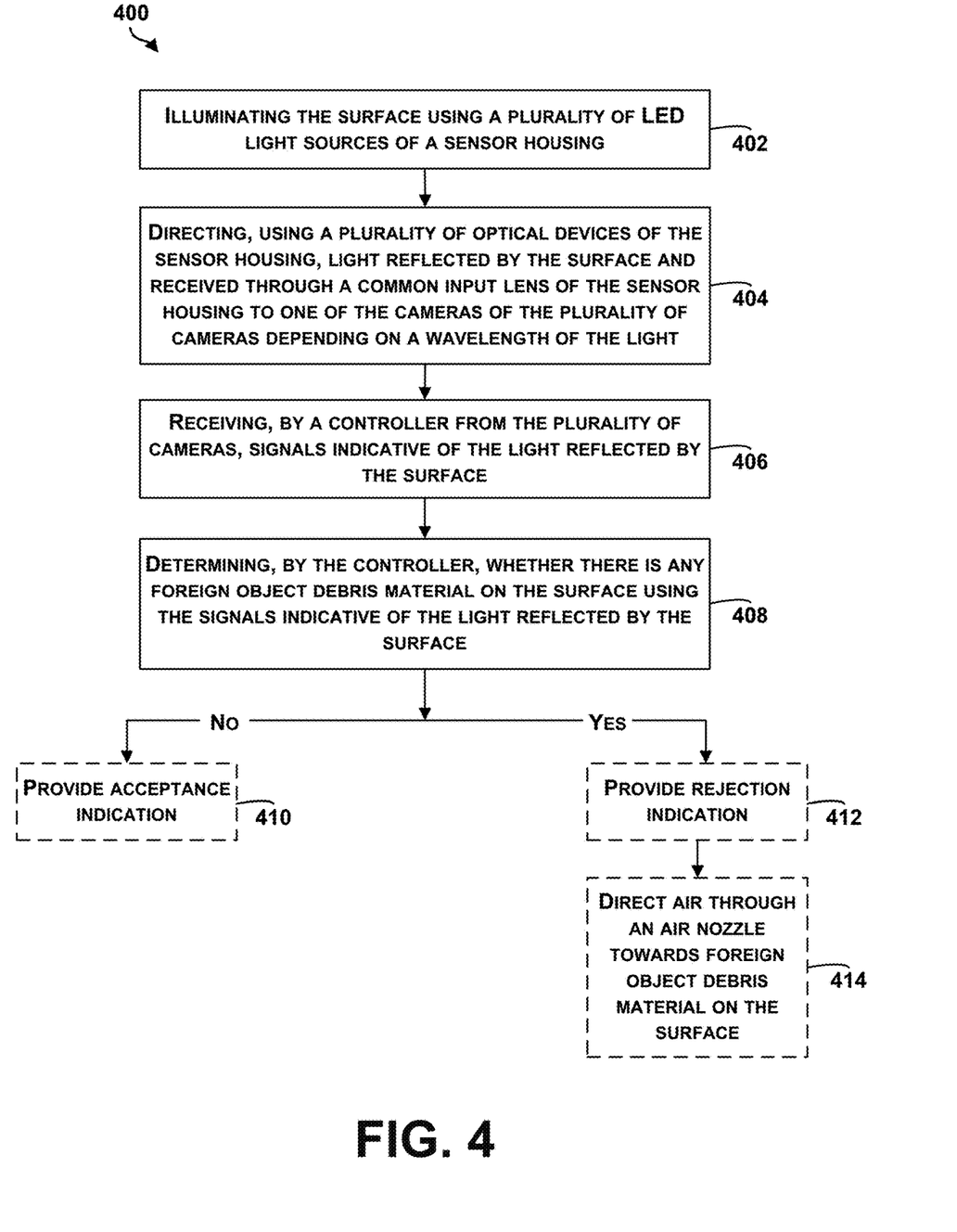
FIG. 4 shows a flowchart of a method, according to an example.

FIG. 4 shows a flowchart of a method 400, according to an example. Method 400 shown in FIG. 4 presents an embodiment of a method that, for example, could be used with the system 100 shown in FIGS. 1 and 2, for example, or any of the systems disclosed herein. Any of the example devices or systems described herein, such as components of system 100, may be used or configured to perform logical functions presented in FIG. 4.

Method 400 can include one or more operations, functions, or actions as illustrated by one or more of blocks 402-414. Although these blocks are illustrated in a sequential order, these blocks may also be performed in parallel, and/or in a different order than those described herein. Also, the various blocks may be combined into fewer blocks, divided into additional blocks, and/or removed based upon the desired implementation.

It should be understood that for this and other processes and methods disclosed herein, flowcharts show functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer readable medium or data storage, for example, such as a storage device including a disk or hard drive. The computer readable medium may include non-transitory computer readable medium or memory, for example, such as computer readable media that stores data for short periods of time like register memory, processor cache, and RAM. The computer readable media may also be any other volatile or non-volatile storage systems. The computer readable medium may be considered a tangible computer readable storage medium, for example.

Initially, at block 402, the method 400 includes illuminating the surface using a plurality of LED light sources of a sensor housing. The surface can be a surface of a composite part. Illuminating the surface can involve a controller causing the plurality of LED light sources to constantly illuminate the surface. The plurality of LED light sources can, for example, include an ultraviolet light LED light source and a visible light LED light source. In some examples, block 402 can also include causing a thermal excitation source to direct infrared radiation across the surface.

The sensor housing can define a plurality of horizontal layers, and include a plurality of cameras. Each camera can be positioned within a respective horizontal layer of the plurality of horizontal layers. Positioning each camera at a different horizontal layer allows a plurality of optical devices within the sensor housing to isolate portions of light received into the housing and direct the portions of light to different cameras. Each camera can be configured to detect a respective range of wavelengths of light. For example, a first camera can be an infrared camera configured to detect infrared light, a second camera can be an ultraviolet light camera configured to detect ultraviolet light, and a third camera can be a visible light camera configured to detect visible light.

At block 404, the method 400 includes directing, using a plurality of optical devices of the sensor housing, light reflected by the surface and received through a common input lens of the sensor housing to one of the cameras of the plurality of cameras depending on a wavelength of the light. The plurality of optical devices can include one or more dichroic filters that allow light within a first range of wavelengths to pass through but reflect light that is outside of the range of wavelengths. Directing light reflected by the surface to one of the cameras depending on a wavelength of the light can involve reflecting infrared light to an infrared camera using a first dichroic filter, and allowing ultraviolet light and visible light to pass through the first dichroic filter. Further, a second dichroic filter can then reflect the ultraviolet light that passes through the first dichroic filter to an ultraviolet light camera and allow visible light to pass through the second dichroic filter. Still further, a mirror can then reflect the visible light that passes through the second dichroic filter to the visible light camera.

At block 406, the method 400 includes receiving, by a controller from the plurality of cameras, signals indicative of the light reflected by the surface. By way of example, the controller can receive from an ultraviolet light camera signals indicative of ultraviolet light reflected by the surface from an ultraviolet light camera, receive from a visible light camera signals indicative of visible light reflected by the surface, and/or receive from an infrared camera signals indicative of infrared light reflected by the surface.

At block 408, the method 400 includes determining, by the controller, whether there is any foreign object debris material on the surface using the signals indicative of the light reflected by the surface. Determining whether there is any foreign object debris material on the surface can involve using image processing techniques to detect anomalies in signals received from the plurality of cameras and identify the detected anomalies as being indicative of foreign object debris material on the surface.

For example, the controller can have previously calibrated each camera of the plurality of cameras on a clean sample of the surface. The calibration process can establish one or more threshold levels, such as signal intensity thresholds, for the plurality of cameras. In the case of an infrared signal, the signal intensity could represent a temperature. In the case of a visible light signal or an ultraviolet light signal, the signal intensity could represent a brightness level. Determining whether there is any foreign object debris material on the surface can then involve determining whether signals received from one or more of the plurality of cameras satisfy one or more corresponding threshold levels (e.g., received signal exceeds or falls below a threshold level). Based on the signals satisfying one or more threshold levels, the controller can determine that there is foreign object debris material on the surface. Conversely, based on the signals not satisfying any of the one or more threshold levels, the controller can determine that there is not any foreign object debris material on the surface.

Optionally, based on a determination that there is not any foreign object debris material on the surface, then, at block 410, an acceptance indication may be provided. For instance, upon determining that there is not any foreign object debris material on the surface, the controller can cause an audio element (e.g., a speaker or a buzzer) to provide an audible acceptance indication and/or cause a lighting element (e.g., an LED or a display) to provide a visual acceptance indication. Whereas, based on a determination that there is foreign object debris material on the surface, then, at block 412, a rejection indication may be provided. Like the acceptance indication, the rejection indication may be an audible indication or a visual indication.

The method 400 can also include, at block 414, directing air through an air nozzle towards foreign object debris material on the surface based on a determination that there is foreign object debris material on the surface. Upon determining that there is foreign object debris material on the surface, the controller can cause air to be directed through the air nozzle and toward the surface. In this manner, the air can blow the foreign object debris material off of the surface.

The description of the different advantageous arrangements has been presented for purposes of illustration and description, and is not intended to be exhaustive or limited to the examples in the form disclosed. After reviewing and understanding the foregoing disclosure, many modifications and variations will be apparent to those of ordinary skill in the art. Further, different examples may provide different advantages as compared to other examples. The example or examples selected are chosen and described in order to best explain the principles, the practical application, and to enable others of ordinary skill in the art to understand the disclosure for various examples with various modifications as are suited to the particular use contemplated.

What is claimed is:

1. A system for inspecting a surface, comprising:
a sensor housing defining a plurality of horizontal layers, the sensor housing comprising:
a plurality of light-emitting diode (LED) light sources configured to illuminate the surface,
a plurality of cameras, each camera of the plurality of cameras positioned within a respective horizontal layer of the plurality of horizontal layers and configured to detect a respective range of wavelengths of light, and a plurality of optical devices configured to receive light reflected by the surface through a common input lens and direct the light to one of the cameras of the plurality of cameras depending on a wavelength of the light; and a controller communicatively coupled to the plurality of cameras, the controller configured to receive signals from the plurality of cameras indicative of the light reflected by the surface and determine whether there is any foreign object debris material on the surface using the signals from the plurality of cameras.

2. The system of claim 1, wherein the system is configured to be attached to a composite layup machine, and wherein the system further comprises a cooling source configured to cool the sensor housing.

3. The system of claim 2, wherein the system is configured to be attached to a head of the composite layup machine.

4. The system of claim 2, wherein the cooling source comprises a solid-state thermoelectric cooler.

5. The system of claim 1, wherein the plurality of cameras comprises an infrared camera positioned within a first horizontal layer of the plurality of horizontal layers, an ultraviolet light camera positioned within a second horizontal layer of the plurality of horizontal layers, and a visible light camera positioned within a third horizontal layer of the plurality of horizontal layers.

6. The system of claim 1, wherein the plurality of optical devices comprises a first dichroic filter positioned in a first horizontal layer of the plurality of horizontal layers, wherein the first dichroic filter is configured to pass light of a first range of wavelengths to a second horizontal layer of the plurality of horizontal layers that is higher than the first horizontal layer, and wherein the first dichroic filter is configured to reflect light of a second range of wavelengths that is different from the first range of wavelengths to a first camera of the plurality of cameras, the first camera being configured to detect light of the second range of wavelengths.

7. The system of claim 6, wherein the first dichroic filter is coated with a bandpass filter corresponding to the first range of wavelengths.

8. The system of claim 6, wherein the plurality of optical devices further comprises a second dichroic filter positioned in the second horizontal layer, wherein the second dichroic filter configured to pass light of a third range of wavelengths to a third horizontal layer of the plurality of horizontal layers that is higher than the second horizontal layer, and wherein the second dichroic filter is configured to reflect light of a fourth range of wavelengths that is different from the third range of wavelengths to a second camera of the plurality of cameras, the second camera being configured to detect light of the fourth range of wavelengths.

9. The system of claim 8, further comprising a mirror positioned in the third horizontal layer, the mirror configured to reflect light of the third range of wavelengths to a third camera of the plurality of cameras, the third camera being configured to detect light of the third range of wavelengths.

10. The system of claim 1, wherein the plurality of LED light sources comprises an ultraviolet light LED light source and a visible light LED light source.

11. The system of claim 10, wherein the ultraviolet light LED light source comprises multiple ultraviolet light LEDs arranged in a first ring, and wherein the visible light LED light source comprises multiple visible light LEDs arranged in a second ring.

12. The system of claim 1, further comprising a thermal excitation source configured to direct infrared radiation across the surface, wherein the plurality of cameras comprises an infrared camera configured to output signals indicative of infrared light emitted by the surface.

13. The system of claim 1, further comprising an air nozzle, wherein the controller is further configured to cause air to be directed through the air nozzle and towards foreign object debris material on the surface based on a determination that there is foreign object debris material on the surface.

14. The system of claim 1, further comprising a radio-frequency communication module configured to wirelessly transmit data indicative of whether there is any foreign object debris material on the surface.

15. The system of claim 1, further comprising a nitrogen purging system configured to purge the sensor housing with nitrogen.

16. The system of claim 1, wherein the controller is further configured to synchronize triggering of the plurality of cameras such that the signals indicative of the light reflected by the surface are indicative of light reflected by a same area of the surface.

17. A sensor housing for a system for inspecting a surface, the sensor housing defining a plurality of horizontal layers and comprising:
 a plurality of light-emitting diode (LED) light sources configured to illuminate the surface;
 a plurality of cameras, each camera of the plurality of cameras positioned within a respective horizontal layer of the plurality of horizontal layers and configured to detect a respective range of wavelengths of light; and
 a plurality of optical devices configured to receive light reflected by the surface through a common input lens and direct the light to one of the cameras of the plurality of cameras depending on a wavelength of the light.

18. The sensor housing of claim 17, wherein the plurality of cameras comprises an infrared camera positioned within a first horizontal layer of the plurality of horizontal layers, an ultraviolet light camera positioned within a second horizontal layer of the plurality of horizontal layers, and a visible light camera positioned within a third horizontal layer of the plurality of horizontal layers.

19. A method for inspecting a surface comprising:
 illuminating the surface using a plurality of light-emitting diode (LED) light sources of a sensor housing, the sensor housing defining a plurality of horizontal layers and comprising a plurality of cameras, wherein each camera of the plurality of cameras is positioned within a respective horizontal layer of the plurality of horizontal layers and configured to detect a respective range of wavelengths of light;
 directing, using a plurality of optical devices of the sensor housing, light reflected by the surface and received through a common input lens of the sensor housing to one of the cameras of the plurality of cameras depending on a wavelength of the light;
 receiving, by a controller from the plurality of cameras, signals indicative of the light reflected by the surface; and
 determining, by the controller, whether there is any foreign object debris material on the surface using the signals indicative of the light reflected by the surface.

20. The method of claim 19, further comprising causing air to be directed through an air nozzle towards foreign object debris material on the surface based on a determination that there is foreign object debris material on the surface.

* * * * *